United States Patent [19]

Baggett

[11] 4,111,910

[45] Sep. 5, 1978

[54] POLYCARBONATES HAVING CARBAMATE TERMINAL GROUPS

[75] Inventor: Joseph M. Baggett, Freeport, Tex.

[73] Assignee: The Dow Chemical Company, Midland, Mich.

[21] Appl. No.: 847,889

[22] Filed: Nov. 2, 1977

Related U.S. Application Data

[63] Continuation-in-part of Ser. No. 704,203, Jul. 12, 1976, abandoned.

[51] Int. Cl.$^2$ .............................................. C08G 63/62
[52] U.S. Cl. ...................................... 528196; 528/199
[58] Field of Search ............ 260/47 XA, 77.5 D, 463, 260/49

[56] References Cited

U.S. PATENT DOCUMENTS

| | | | |
|---|---|---|---|
| 3,028,365 | 4/1962 | Schnell et al. | 260/47 XA |
| 3,215,668 | 11/1965 | Bissinger et al. | 260/47 XA |
| 3,223,678 | 12/1965 | Bolgiano | 260/47 XA |

*Primary Examiner*—Theodore E. Pertilla
*Attorney, Agent, or Firm*—B. G. Colley

[57] ABSTRACT

Aromatic polycarbonates having carbamate end groups are prepared using a terminating amount of ammonia, ammonium compounds, primary cycloalkyl, aliphatic, or aralkyl amines and secondary cycloalkyl, alkyl, or aralkyl amines. The products of this invention have been found to have a relatively high limited oxygen index compared to polycarbonates without carbamate end groups.

7 Claims, No Drawings

POLYCARBONATES HAVING CARBAMATE TERMINAL GROUPS

CROSS REFERENCE TO RELATED APPLICATIONS

This is a continuation-in-part of Ser. No. 704,203 filed July 12, 1976 now abandoned.

BACKGROUND OF THE INVENTION

This invention relates to polycarbonates having substituted or unsubstituted carbamate terminal groups.

It is known that in the interfacial polymerization process to make aromatic polycarbonates from dihydric phenols and phosgene the use of small amounts of diverse chain terminators can be used to provide end or terminal groups. Examples of patents which disclose these known terminal groups are U.S. Pat. No. 3,085,992 Lee, et al. (alkanol amines) and U.S. Pat. No. 3,399,172, Jaquiss (imides).

It is also known from Schnell et al., U.S. Pat. No. 3,028,365 that aromatic amines and other mono-functional compounds can be used to control or regulate the molecular weight of the polycarbonates, thereby forming aryl carbamate terminal groups. However, aromatic amines, such as aniline, are known to be carcinogenic and thus should be avoided if at all possible. See for example "Chemical Carcinogens" by C. E. Searle pages 366–461 (1976) ACS Monograph 173.

According to Schnell on page 183 in his book "Chemistry and Physics of Polycarbonates" (1964), ammonium hydroxide and amines are known to saponify polycarbonates back to the monomers i.e. bisphenol A. This is confirmed by Bolgiano in U.S. Pat. No. 3,223,678 wherein he indicates that small amounts of amines such as monoethanolamine and morpholine break or degrade polycarbonates into lower molecular weight polycarbonates.

SUMMARY OF THE INVENTION

It now has been discovered that thermoplastic aromatic polycarbonates can be made in the presence of terminating amounts of ammonia, cycloalkyl, aralkyl, or alkyl amines previously taught to degrade the polymer. Thereby, carbamate terminal groups of the formula —O—C(O)—N(R) (R') are formed wherein R and R' are independently selected from hydrogen, cycloalkyl, aralkyl, and alkyl groups of 1-18 carbon atoms. The amines used herein are very basic when compared to the weakly basic aryl amines previously taught and are mono-functional with respect to functional groups containing active hydrogens, as opposed to the previously taught alkanol amines.

The high molecular weight polycarbonates perepared herein have a weight average molecular weight range from about 10,000 to about 60,000 and preferrably in the range from about 25,000 to about 50,000 as measured by gel permeation chromatography (GPC) and have carbamate end groups. The polymers of this invention have been found to have a surprisingly high limited oxygen index as compared to the unmodified bisphenol polycarbonates.

DETAILED DESCRIPTION

A number of different methods may be used to prepare the products of this invention. For example, a high molecular weight polycarbonates having reactive chloroformate end groups may be prepared as set forth in Ser. No. 704,202 filed on July 12, 1976. After the high molecular weight polycarbonate is formed it is reacted at a temperature in the range from about 10° C. to about 35° C. with a chain terminating amount of a compound such as ammonia, an ammonium compound which liberates ammonia under the above reaction conditions, secondary aliphatic or aralkyl amines, and primary aliphatic or aralkyl amines, all of which are very basic, e.g. having a base dissociation constant in aqueous solution of $>10^{-6}$.

The recovery of the polycarbonate is accomplished by decanting the aqueous layer, treating the remaining halogenated solvent with a strong aqueous acid solution (pH 1–3) such as hydrochloric or sulfuric acid solution, to neutralize the NaOH or KOH and washing with distilled water.

Finally, the polymer is precipitated from the solvent solution by pouring it into an excess of a non-solvent for the polymer such as hexane, ethanol, petroleum ether, etc. The white precipitated polymer is then filtered, water washed and dried in a vacuum.

Suitable examples of ammonium compounds which liberate ammonia under the reaction conditions are ammonium hydroxide, ammonium carbonate, ammonium sulfite, ammonium chloride, ammonium phosphate, ammonium sulfate, ammonium nitrate and the like.

Suitable examples of secondary amines are dimethyl amine, ethyl methyl amine, diethyl amine, dibenzyl amine di-n-propyl amine, dicyclopentyl amine, di-n-butyl amine, methyl octyl amine, methyl benzyl amine, dioctyl amine, didodecyl amine, dioctadecyl amine, dicyclohexyl amine and the like.

Suitable examples of primary amines are methyl amine, ethyl amine, cyclohexyl amine, n-butylamine, propylamine, n-hexylamine, n-octylamine, benzyl amine, n-octadecylamine, phenethyl amine, and the like.

The chain terminating compounds such as ammonia or the amines set forth above are added to the polycarbonates after their formation in an amount from about 100 to about 800 mole percent based on the amount of chloroformate end groups present in the polycarbonates and preferably in an amount from about 120 to about 600 mole percent.

The polycarbonates of this invention may also be prepared by procedures taught in U.S. Pat. Nos. 3,275,601 or 3,028,365 wherein the compound added to control the molecular weight is an amine, ammonia or an ammonium compound as taught above or a carbamoyl halide, e.g. ClC(O)NRR', or a monohydric phenol containing as a substituent the group —OC(O)NRR'.

The dihydric phenols employed in the practice of this invention are known dihydric phenols in which the sole reactive groups are two phenolic hydroxyl groups. Some of these are represented by the general formula

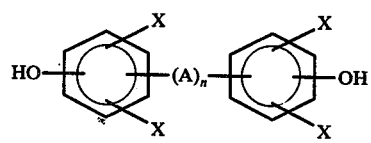

wherein A is a divalent hydrocarbon radical containing 1-15 carbon atoms, —S—, —S—S—,

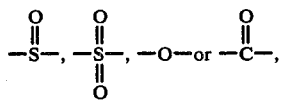

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons or an oxyaryl group of 6-8 carbons and $n$ is 0 or 1.

One group of suitable dihydric phenols are those illustrated below:

1,4-bis(4-hydroxyphenyl)-1-phenyl ethane
1,1-bis(4-hydroxyphenyl1-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxyphenyl)octane
4,4-bis(4-hydroxyphenyl)heptane
3,3-bis(3-methyl-4-hydroxyphenyl)hexane
3,3-bis(3,5-dibromo-4-hydroxyphenyl)hexane
2,2-bis(3,5-difluoro-4-hydroxyphenyl)nutane
2,2-bis(4-hydroxyphenyl)propane (Bis A)
1,1-bis(3-methyl-4-hydroxyphenyl)ethane
1,1-bis(4-hydroxyphenyl)methane.

Another group of dihydric phenols useful in the practice of the present invention include the dihydroxyl diphenyl sulfoxides such as for example:

bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric phenols which may be used in the practice of the invention includes the dihydroxaryl sulfones such as, for example:

bis(3,5-diisopropyl-4-hydroxyphenyl)sulfone
bis(3-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric phenols useful in the practice of the invention includes the dihydroxydiphenyls:

3,3',5,5'-tetrabromo-4,4'-dihyroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric phenols which may be used in the practice of the invention includes the dihydric phenol ethers:

bis(3-chloro-4-methyl-4-hydroxyphenyl)ether
bis(3,5-dibromo-4-hydroxyphenyl)ether
bis(3,5-dichloro-4-hydrocyphenyl)ether
bis(3-ethyl-4-hydroxyphenyl)ether
bis(3-methyl-4-hydroxyphenyl)ether
bis(4-hydroxyphenyl)ether.

A further group of dihydric phenols outside the scope of the above generic formula which may be used in the practice of the invention includes the dihydroxy benzenes, and the halo-and alkylsubstituted dihydroxy benzenes, such as, for example, resorcinol, hydroquinone, 1,4-dihydroxy-2-chlorobenzene, 1,4-dihydroxy-2-bromobenzene, 1,4-dihydroxy-2,3-dichlorobenzene, 1,4-dihydroxy-2-methylbenzene, 1,4-dihydroxy-2,3-dimethylbenzene, 1,4-dihydroxy-2-bromo-3-propylbenzene.

Other dihydric phenols of interest include the phthalein type bisphenols which are disclosed in U.S. Pat. Nos. 3,035,021; 3,036,036; 3,036,037; 3,036,038; 3,036,3039.

It is, of course, possible to employ a mixture of two or more different dihydric phenols in preparing the thermoplastic carbonate polymers of the invention.

The carbonate precursor employed in the process of this invention to prepare the linear thermoplastic polycarbonates is carbonyl chloride or phosgene.

EXAMPLE 1

Into a 1.1 flask equipped with stirrer, purge tube, thermometer, and reflux condenser were weighed 75 gm of p-bisphenol and 276 gm water. The contents were purged with nitrogen to remove the air, then 34 ml of 35% aqueous sodium hydroxide were added. The nitrogen purge and stirring were continued for 5 minutes. At this time, 1.36 gms of 28% aqueous ammonium hydroxide were added and the contents stirred for another 5 minutes. Then, 214 ml of methylene chloride were added with stirring for 5 minutes. Phosgenation was started, with alternating additions of phosgene and additional 35% caustic as follows: 14 gms phosgene, 14 mls 35% NaOH; 10 gms phosgene, 14 ml 35% NaOH; 6 gms phosgene, 14 ml 35% NaOH; 5 gms phosgene, 6 ml 35% NaOH; and finally 6 gms phosgene. The phosgene gas feed rate was about 1.4 gms per minute. The reaction temperature was 28°-35° C. The above reactants were digested with stirring for 20 minutes at 28° C., then a solution containing 3.6 gms ammonium chloride in 20 ml of water were added with digestion and stirring for another 20 minutes. The reactants were allowed to separate into two phases. The water phase was siphoned off; the polymer solution was acidified with concentrated HCl, then the solution was washed twice with water and transferred to a separatory funnel where it was allowed to stand for 2 hours. The polymer solution was filtered through dry diatomaceous earth resulting in a clear, colorless solution. The polymer was cleaned up by precipitation of the methylene chloride polymer solution in hexane, then filtered and vacuum dried at 100° C.

This polymer was molded into tough, clear test bars having the following properties.

| | |
|---|---|
| LOI (ASTM D-2863) | 34 |
| Weight average Molecular Wt. by gel permation chromatography | 29,985 |
| IR indicated | carbamate groups |
| Analysis for nitrogen | 480 ppm |

EXAMPLES 2-4

Into a 2 liter flask equipped with stirrer, dip tube, thermometer, and reflux condenser are added 200 gms p-bisphenol A, 3 gms ammonium sulfite, and 740 ml of water. The contents are stirred and nitrogen purged for 10 minutes, then 93 ml of 35% sodium hydroxide were added continuing the stirring and nitrogen purging for another 5 minutes. Phosgene gas was added through the dip tube, with stirring, until 5.0 gms of phosgene had been added, then 570 mls of methylene chloride were fed in and phosgenation continued, cycling the pH from 9 to 13 by adding additional 35% sodium hydroxide at intervals during phosgenation, maintaining a reaction temperature from 25°–32° C. until a total of 222 mls of 35% sodium hydroxide and 110 gms of gaseous phosgene are added. Then the reactants are stirred and digested at 28°–30° C. for 30 minutes. At this point, the stirrer was stopped, allowing the contents to separate into two phases.

A sample of the methylene chloride polymer solution was taken for testing. A portion of the sample, about 10 mls, was placed into a 50 ml beaker and to this was added 0.5 gm of calcium hydroxide plus 0.05 ml of triethylamine. Upon stirring, the contents became very viscous. The increase in viscosity clearly indicates the presence of the chloroformate reactive end groups.

A second portion of the sample was precipitated in hexane, filtered and dried for molecular weight determination by Gel Permeation Chromatography (GPC). After the samples were taken, various amounts of the water-amine solutions given below were added. At various time intervals during the reaction, methylene chloride polymer samples are taken and checked for reactive end groups using the above calcium hydroxide-triethylamine test. When this test gave no increase in viscosity, the run was stopped. The amount of time required for the amine solutions to react with the chloroformate groups was about one hour.

The amine-water solutions used for capping the chloroformate end group were as follows:

| Example 2 | 2.8 gms benzylamine + 60 mls $H_2O$ |
| Example 3 | 2.4 gms di-n-butylamine + 120 mls $H_2O$ |
| Example 4 | 1.6 gms 40% aqueous methylamine + 50 mls $H_2O$ |

The methylene chloride-polymer solution was separated from the water, acidified with hydrochloric acid, washed twice with water, transferred to a separating funnel and allowed to stand several hours, then filtered through dry diatomaceous earth. The resulting polymer solution was clear and colorless. The solution was precipitated in hexane, filtered and dried in a vacuum oven at 120° C.

The total charge for each of the reactants exclusive of the amines in these examples was as follows:
200 gms p-bisphenol A
3.0 gms ammonium sulfite
740 mls $H_2O$
222 mls 35% sodium hydroxide
570 mls methylene chloride
110 mls phosgene Examples 2–4 were also injection molded into test bars. The plastic was clear with excellent color. The indicated infrared spectrum clearly indicated the carbamate structure was present. Standard tests were performed on the test bars.

The results for Examples 1–4 are given in Table I. It was noted that the molecular weight of the polycarbonates decreased about 10–20% when the amines were used to cap them.

TABLE I

| | POLYMER PROPERTIES | | | | |
|---|---|---|---|---|---|
| Example | Izod Impact Strength[1] | Melt Index 300° C[2] | Heat Def. ° F[3] | LOI[4] | G.P.C. $M_w$ |
| 1 | — | — | — | 34.0 | 29,985 |
| 2 | 20.7 | 10.4 | 293 | 38.0 | 29,109 |
| 3 | 20.4 | 3.2 | 318 | 38.0 | 39,184 |
| 4 | 20.5 | 3.9 | 308 | 40.0 | 26,113 |
| Control (Lexan) | — | — | — | 27.0 | — |

[1] ASTM D-256
[2] ASTM D-1238
[3] ASTM D-648
[4] ASTM D-2863

I claim:

1. A high molecular weight aromatic polycarbonate having carbamate terminal groups of the formula —O—C(O)—N(R) (R') wherein R and R' are independently selected from hydrogen, cycloalkyl, alkyl, and aralkyl groups of 1–18 carbons, and wherein the weight average molecular weight range is from about 10,000 to about 60,000.

2. The polycarbonate of claim 1 wherein the weight average molecular weight range is from about 25,000 to about 50,000.

3. The polycarbonate of claim 1 wherein R and R' are both hydrogen.

4. The polycarbonate of claim 1 wherein R is hydrogen and R' is an alkyl group.

5. The polycarbonate of claim 1 wherein R and R' are both alkyl groups.

6. The polycarbonate of claim 4 wherein R' is methyl.

7. The polycarbonate of claim 5 wherein R and R' are n-butyl groups.